United States Patent [19]
> Canivenc et al.

[11] Patent Number: 4,940,765
[45] Date of Patent: Jul. 10, 1990

[54] 3-BENZYLIDENECAMPHOR-SUBSTITUTED DIORGANOPOLYSILOXANES

[75] Inventors: Edith Canivenc, Lyons; Serge Forestier, Claye-Souilly; Michel Gay, Lyons; Gerard Lang, Saint-Gratien; Herve Richard, Paris, all of France

[73] Assignee: Rhone-Poulenc Chimie, Courbevoie, France

[21] Appl. No.: 291,698

[22] Filed: Dec. 29, 1988

[30] Foreign Application Priority Data

Dec. 29, 1987 [FR] France ................... 87 18509

[51] Int. Cl.$^5$ ............................. C08G 77/06
[52] U.S. Cl. ........................ 528/15; 524/265; 524/267; 524/269; 525/474; 528/25; 528/31; 528/33; 556/436; 556/462; 556/479
[58] Field of Search ............ 528/15, 25, 31, 33; 556/462, 436, 479; 524/265, 267, 269; 525/474

[56] References Cited

U.S. PATENT DOCUMENTS 2,970,150  1/1961  Bailey ........................... 528/15
4,843,136  6/1989  Reiners et al. ............... 556/462

Primary Examiner—Melvyn I. Marquis
Attorney, Agent, or Firm—Burns, Doane, Swecker & Mathis

[57] ABSTRACT

3-Benzylidenecamphor-substituted diorganopolysiloxanes, well adopted for incorporation into coating and lubricant compositions (notably as a lubricant for PVC), have the structural formulae (1) and (2)

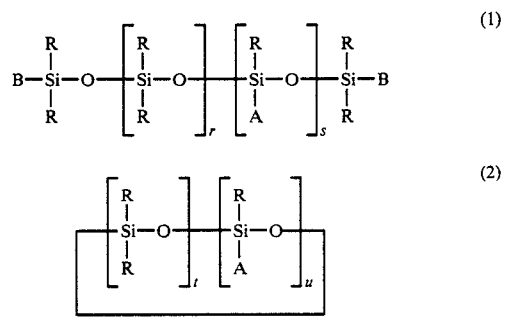

wherein A and/or B is a 3-benzylidenecamphor moiety.

7 Claims, No Drawings

3-BENZYLIDENECAMPHOR-SUBSTITUTED DIORGANOPOLYSILOXANES

FIELD OF THE INVENTION

1. Field of the Invention

The present invention relates to novel diorganopolysiloxanes comprising a 3-benzylidenecamphor functional group.

2. Description of the Prior Art

It is known to this art to modify diorganopolysiloxanes by means of various organic functional groups within the polymer chain and/or at the end of a polymer chain, for the purpose of imparting specific properties to such silicon polymers.

A convenient technique for introducing these organic functional groups is to conduct a hydrosilylation reaction in the presence of a catalytically effective amount of a platinum catalyst, of a diorganopolysiloxane bearing at least one SiH group with an ethylenically unsaturated organic compound.

For example, the following references are illustrative of this prior art:

(1) U.S. Pat. Nos. 2,970,150 and 4,160,775 describing the addition of allyl or methallyl alcohol to a silane or diorganopolysiloxane bearing at least one SiH group;

(ii) U.S. Pat. Nos. 3,767,690 and 4,503,208 describing diorganopolysiloxanes bearing groups containing an acrylate or methacrylate functional group;

(iii) U.S. Pat. No. 4,640,967 describing diorganopolysiloxanes bearing epoxy and/or acrylate or methacrylate groups and their preparation as a composition for coating optical fibers; and (iv) Patent EP-A-0,088,842 describing diorganopolysiloxanes bearing benzophenone groups.

SUMMARY OF THE INVENTION

A major object of the present invention is the provision of novel diorganopolysiloxanes modified with organic functional groups which, on the one hand, have a high refractive index with a view to incorporating same into coating compositions for optical fibers, and, on the other hand, are suitable as a lubricant for plastics, in particular for PVC.

Briefly, the present invention features modified diorganopolysiloxane polymers having the formula (1):

$$B-\underset{R}{\overset{R}{Si}}-O-\left[\underset{R}{\overset{R}{Si}}-O\right]_r\left[\underset{A}{\overset{R}{Si}}-O\right]_s\underset{R}{\overset{R}{Si}}-B \quad (1)$$

in which the symbols R, which may be identical or different, are each a $C_1-C_{10}$ alkyl, phenyl or 3,3,3-trifluoropropyl radicals, at least 80% of the number of radicals R being methyl radicals; the symbols B, which may be identical or different, are each a radical R or a radical A; r is an integer ranging from 0 to 200, inclusive; and s is an integer ranging from 0 to 50, inclusive, with the proviso that, if s is 0, at least one of the two symbols B is A; or having the formula (2):

$$\left[\underset{R}{\overset{R}{Si}}-O\right]_t\left[\underset{A}{\overset{R}{Si}}-O\right]_u \quad (2)$$

in which R is as defined in formula (1); u is an integer ranging from 1 to 20, inclusive; t is an integer ranging from 0 to 20, inclusive; and t+u is equal to or greater than 3.

In the above formulae (1) and (2), the symbol A is a radical of the formula (3):

(3) [structure showing camphor moiety with =CH- linker to benzene ring bearing $R_1$, $R_2$, $R_3$ substituents]

in which $R_1$ and $R_2$ are each a hydrogen atom, a $C_1-C_6$ alkyl radical, a $C_1-C_6$ alkoxy, hydroxy or trimethylsilyloxy radical, or a divalent radical Y:

$$(O)_n-(CH_2)_p-\underset{R_4}{\overset{}{C}H}-CH_2,$$

with the proviso that one of the two radicals $R_1$ and $R_2$ is necessarily the divalent radical Y; $R_4$ is a hydrogen atom or a $C_1-C_4$ alkyl radical; n is 0 or 1; p is an integer ranging from 1 to 10, inclusive; and $R_3$ is a hydrogen atom or a $C_1-C_6$ alkyl or $C_1-C_6$ alkoxy radical.

DETAILED DESCRIPTION OF THE PREFERRED EMBODIMENTS OF THE INVENTION

More particularly according to the present invention, the preferred novel diorganopolysiloxanes are random or block polymers of formula (1) or (2) satisfying at least one of the following parameters:

R is methyl;
B is methyl;
r ranges from 5 to 20, inclusive;
s ranges from 2 to 15, inclusive;
t+u ranges from 3 to 10, inclusive;
$R_1$ is H or methoxy;
p ranges from 1 to 3, inclusive;
$R_2$ is H or methoxy; and
$R_3$ is H or methoxy;
one of the two radicals $R_1$ or $R_2$ is the divalent radical Y in which n=0 or 1, p=1, and $R_4$=H or methyl.

In order to prepare the polymers of formulae (1) and (2), it is possible, for example, to start with the corresponding polymer in which all the radicals A are hydrogen atoms.

This polymer is referred to hereinafter as the "polymer containing SiH groups"; the SiH groups may be present within the polymer chain and/or at the ends of a polymer chain. These polymers containing SiH are well-known products in the silicone industry and are generally available commercially.

They are described, for example, in U.S. Pat. Nos. 3,220,972, 3,697,473 and 4,340,709.

This polymer containing SiH groups can therefore be represented by the formula:

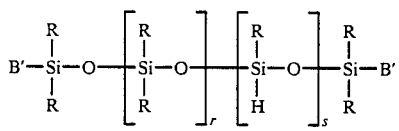
(4)

in which R, r and s are as defined above in the case of formula (1) and radicals B', which may be identical or different, are each a radical R or a hydrogen atom; and by the formula:

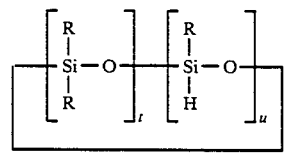
(5)

in which R, t and u are as defined above in the case of formula (2).

A hydrosilylation reaction is carried out on this polymer containing SiH groups, of formula (4) or (5), in the presence of a catalytically effective amount of a platinum catalyst with an organic derivative of 3-benzylidenecamphor having the formula:

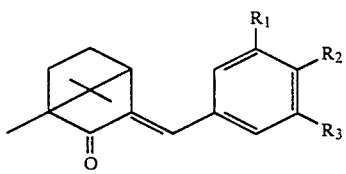
(6)

in which $R_1$, $R_2$ and $R_3$ are as defined in formula (3) above, except that the radical Y is then the monovalent unsaturated homologous radical Y' of formula $-(O)_n-(CH_2)_p-C(R_4)=CH_2$, in which D, p and $R_4$ are also as defined in the formula (3).

The following are more particularly representative of the above derivatives of formula (6):

(a) 4'-Allyloxy-3-benzylidenecamphor;
(b) 4'-Allyloxy-3'-methoxy-3-benzylidenecamphor;
(c) 4'-Methallyloxy-3-benzylidenecamphor;
(d) 4'-Methallyloxy-3'-methoxy-3-benzylidenecamphor;
(e) 3'-Allyl-4'-methoxy-3-benzylidencamphor;
(f) 3'-Allyl-4',5'-dimethoxy-3-benzylidenecamphor;
(g) 3'-Methallyl-4'-methoxy-3-benzylidenecamphor;
(h) 3'-Methallyl-4',5'-dimethoxy-3-bewnzylidenecamphor;
(i) 3'-Allyloxy-4'-methoxy-3-bewnzylidenecamphor;
(j) 3'-Methallyloxy-4'-methoxy-3-benzylidenecamphor;
(k) 4'-Allyl-3',5'-dimethoxy-3-benzylidenecamphor; and
(l) 4'-Methallyl-3',5'-dimethoxy-3-benzylidenecamphor.

The derivatives of formula (a) to (d) are described in French Patent FR-A-2,430,938, hereby incorporated by reference; in particular the synthesis of derivative (a) is described in Example 8 of this patent. The 4'-alkenyloxy homologs are therefore obtained by following the teachings of this patent, by the reaction of the corresponding alkenyl halide with the corresponding p-hydroxy-3-benzylidenecamphor in the presence of sodium carbonate in dimethylformamide.

Derivatives (e) to (l) and their 3'-alkenyl, 4'-alkenyl and 3'-alkenyloxy homologs may be prepared according to one of the following procedures:

First Procedure

Preparation of compounds of formula (6) in which $R_1$ is a radical $-(O)_n-(CH_2)_p-C(R_4)=CH_2$ or else $R_2$ is a radical $-(CH_2)_p-C(R_4)=CH_2$, where $R_1$, $R_2$, n, p, $R_4$ and $R_3$ are as defined above.

An aromatic aldehyde of formula (II) is condensed with synthetic camphor (d,l-camphor) or natural camphor (d-camphor) according to the following reaction scheme:

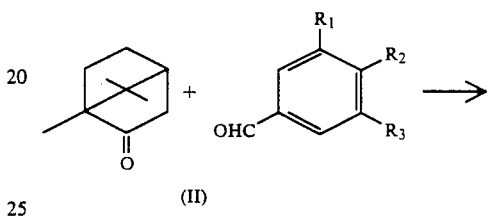

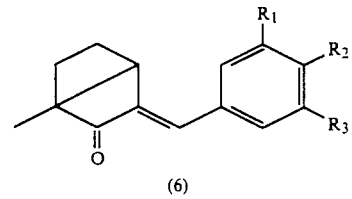
(6)

This reaction is carried out in the presence of a base, for example in the presence of an alkali metal amide, hydride or alcoholate, in an inert solvent such as benzene, toluene, ether, dioxane or 1,2-dimethoxyethane, at a temperature of from 0° C. to the boiling point of the solvent.

(a) The aldehyde of formula (II) in which $R_1$ is a radical $-(O)_n-(CH_2)_p-C(R_4)=CH_2$ when n=1, may be prepared by the reaction of an alkenyl halide of formula (III) with an aldehyde of formula (IIA) according to the following reaction scheme:

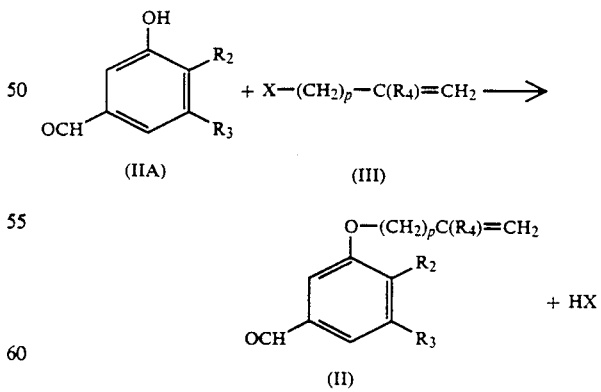

This reaction is carried out in the presence of a base in a solvent, for example in the presence of an alkali metal or alkaline-earth metal carbonate or hydroxide or of an alkali metal amide, hydride or alcoholate, in a solvent compatible with the nature of the base, such as water or an organic solvent such as dimethylformamide, dimethyl sulfoxide, dioxane or an alcohol, at a temperature ranging from ambient temperature to the boiling point of the solvent.

In the aldehyde of formula (IIA), which may be prepared according to known methods, and in the aldehyde of formula (II), in which $R_1$ is a radical $-O-(CH_2)_p-C(R_4)=CH_2$, $R_2$ and $R_3$ are each a hydrogen atom, a $C_1$-$C_6$ alkyl radical or a $C_1$-$C_6$ alkoxy radical. In the compound of formula (III), X is a halogen, preferably a chlorine or bromine atom, and $R_4$ and p are as defined above.

(b) The aldehyde of formula (II) in which $R_1$ is a radical $-(O)_n-(CH_2)_p-C(R_4)=CH_2$ when n=0, or in which $R_2$ is a radical $-(CH_2)_p-C(R_4)=CH_2$, may be prepared by the reaction of ethyl orthoformate with a phenylmagnesium bromide of formula (IV), followed by a hydrolysis of the acetal formed, according to the following reaction scheme:

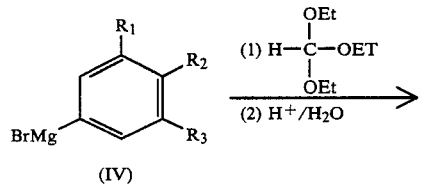

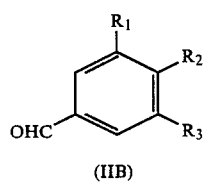

This reaction may be carried out under the conditions described by Quelet (C. R. Acad. Science, vol. 82, p. 1,285 and Bull, Soc. Chim. Fr., vol. 45, p. 267), for example in an inert solvent such as ethyl ether, dioxane or 1,2-dimethoxyethane, at a temperature ranging from ambient temperature to the boiling point of the solvent.

In the compounds of formulae (IIB) and (IV), one of the substituents $R_1$ or $R_2$ is a radical $(CH_2)_p-C(R_4)=CH_2$, $R_4$ and p being defined as above, and the other is a hydrogen atom, a $C_1$-$C_6$ alkyl radical or a $C_1$-$C_6$ alkoxy radical, and $R_3$ is a hydrogen atom, a $C_1$-$C_6$ alkyl radical or a $C_1$-$C_6$ alkoxy radical.

Second Procedure

Preparation of compounds of formula (6) in which $R_1$ is a radical $-(O)_n-(CH_2)_p-C(R_4)=CH_2$ when n is equal to 1 (compound IA).

These compounds may be prepared by the reaction of an alkenyl halide of formula (III) with a 3'-hydroxy-3-benzylidenecamphor of formula (V), in the presence of a base, for example in the presence of an alkali metal or alkaline-earth metal hydroxide or carbonate or of an alkali metal amide, alcoholate or hydride, in a solvent compatible with the nature of the base, such as water or an organic solvent such as an alcohol, dioxane, dimethylsulfoxide or dimethylformamide, at a temperature ranging from ambient temperature to the boiling point of the solvent, according to the following reaction scheme:

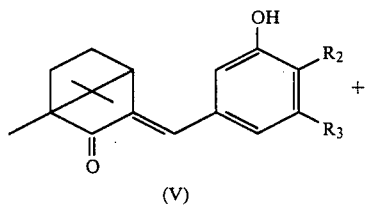

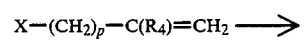

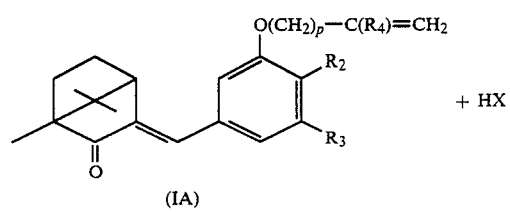

In the compounds of formulae (V), (III) and (IA), $R_2$ and $R_3$ are each a hydrogen atom, a $C_1$-$C_6$ alkyl radical or a $C_1$-$C_6$ alkoxy radical, $R_4$ and p are as defined above and X is a halogen, preferably a chlorine or bromine atom.

Compounds of formula (V) may be prepared by acidic hydrolysis of compounds of formula (VI) in which $R_5$ is a $C_1$-$C_6$ alkyl or alkoxy radical, according to the following reaction scheme:

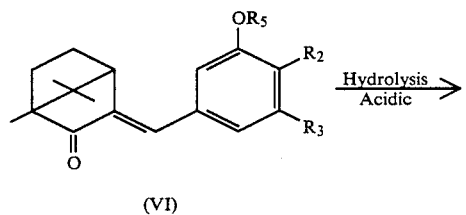

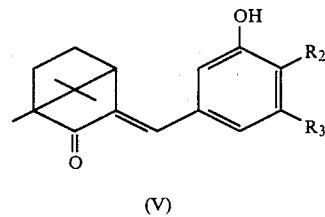

This hydrolysis may be carried out in the presence of a hydrolysis agent such as, for example, pyridine hydrochloride, at a temperature close to the boiling point of the reaction mixture.

Compounds of formula (V) may also be prepared by the condensation of an aldehyde of formula (IIA) with synthetic camphor (d,l-camphor) or natural camphor (d-camphor), according to the following reaction scheme:

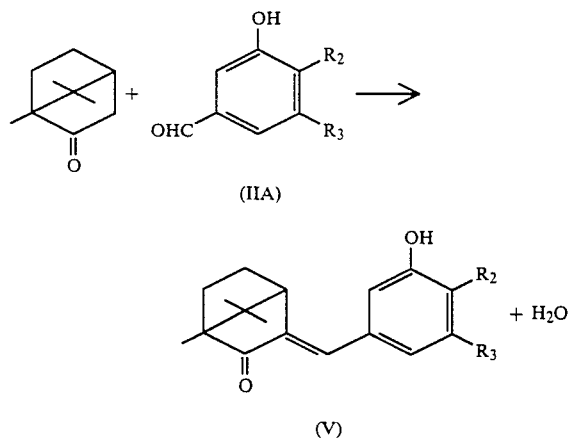

(IIA)

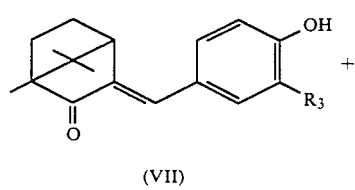

(V)

$R_2$ and $R_3$ are each a hydrogen atom or a $C_1$-$C_6$ alkyl or alkoxy radical.

This reaction is carried out in the presence of a base in a solvent, for example by means of sodium hydride or potassium tert-butylate in dioxane or 1,2-dimethoxyethane, at a temperature ranging from ambient temperature to the boiling point of the solvent.

Third Procedure

Preparation of compounds of formula (6) in which $R_1$ is a radical $-(O)_n-(CH_2)_p-C(R_4)=CH_2$ when $n=0$ and $p=1$: (compounds ID).

These compounds may be prepared by the Claisen rearrangement of a compound of formula (IB) according to the reaction scheme below:

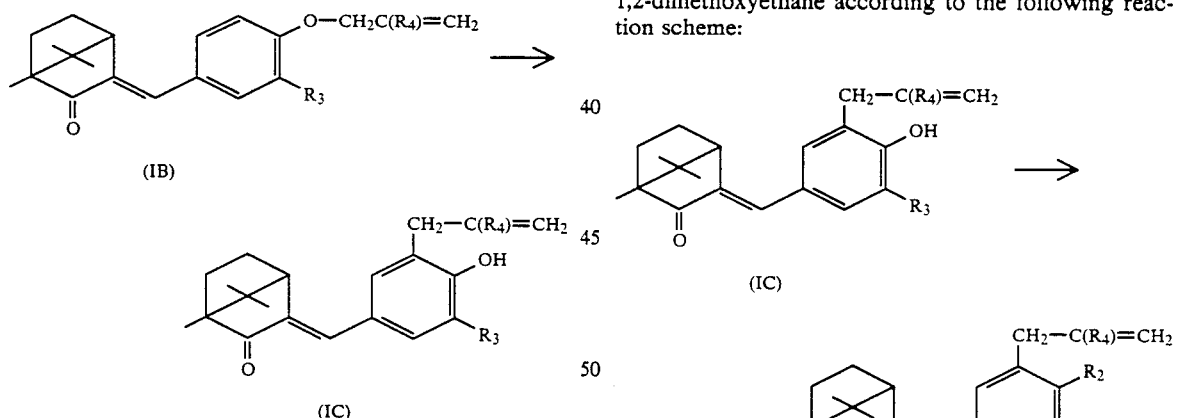

In compounds (IB) and (IC), $R_3$ and $R_4$ are as defined above.

Compound (IB) may be prepared in a known manner, by reacting a 4'-hydroxy-3-benzylidenecamphor of formula (VII) with an alkenyl halide of formula (III) in which $p=1$, according to the scheme:

(III)

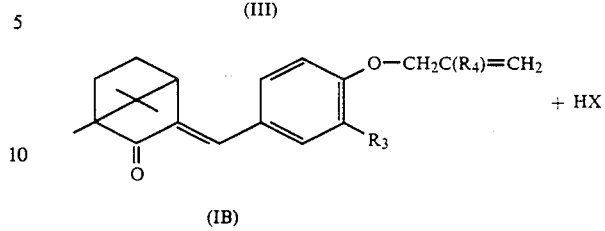

(IB)

$R_3$ and $R_4$ are as defined above and X is a halogen, preferably a chlorine or bromine atom. This reaction takes place in the presence of a base, for example an alkali metal or alkaline-earth metal carbonate or hydroxide, or an alkali metal amide, alcoholte or hydride, in a solvent compatible with the nature of the base, such as water or an organic solvent, for example an alcohol, dioxane, dimethyl sulfoxide or dimethylformamide, at a temperature ranging from ambient temperature to the boiling point of the solvent.

The Claisen rearrangement may be carried out under the conditions described by Tarbell (*Organic Reactions*, vol. 2, John Wiley, New York, 1944, page 1), by heating the compound of formula (IB) to at least approximately 170° C., in the presence of a solvent if desired.

The compound of formula (IC) thus obtained is converted into a compound of formula (ID) in which $R_2$ is a $C_1$-$C_6$ alkoxy radical, by reaction with a $C_1$-$C_6$ alkyl halide in the presence of a base, for example an alkali metal carbonate, in a solvent such as dimethylformamide, or else in the presence of an alkali metal hydride in 1,2-dimethoxyethane according to the following reaction scheme:

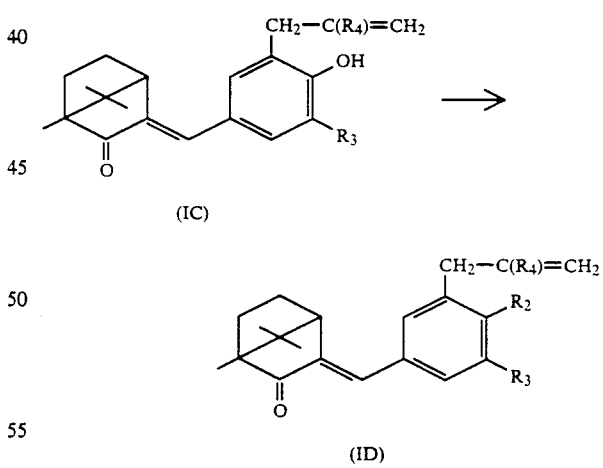

In the compound (ID), $R_2$ is a $C_1$-$C_6$ alkoxy radical and $R_3$ and $R_4$ are as defined above.

The platinum catalysts employed to perform the hydrosilylation reaction of the polymers of formulae (4) or (5) with the organic derivative of formula (6) are fully described in the literature; compare, in particular, the complexes of platinum and of an organic product described in U.S. Pat. Nos. 3,159,601, 3,159,602, 3,220,972 and European Patents EP-A-57,459, EP-A-188,978 and EP-A-190,530, and the complexes of platinum and of vinylated organopolysiloxane which are described in U.S. Pat. Nos. 3,419,593, 3,715,334, 3,377,432 and 3,814,730.

In order to react the polymer containing SiH groups of formulae (4) or (5) with the derivative of formula (6), an amount of platinum catalyst is used of from 5 to 600 ppm, preferably from 10 to 200 ppm, calculated as the weight of platinum metal, based on the weight of polymer containing SiH groups of formulae (4) or (5).

The hydrosilylation reaction can be carried out in bulk or in a volatile organic solvent such as toluene, heptane, xylene, tetrahydrofuran or tetrachloroethylene.

It is generally desirable to heat the reaction mixture to a temperature of 60° to 120° C. for the time required for the reaction to be completed. Furthermore, it is desirable to add the polymer containing SiH groups dropwise to the derivative of formula (6) in solution in an organic solvent.

The determination whether the reaction is complete is carried out by monitoring the residual SiHs using alcoholic potassium hydroxide, and the solvent is then removed, for example by distillation under reduced pressure.

The crude oil obtained may be purified, for example by passing same through a silica absorbent column.

The polymers of formulae (1) or (2) have a remarkably high refractive index. They can therefore be employed, in particular, as a mixture with the organic or organosilane compositions employed for coating optical in the case where it is intended to obtain a coating of high refractive index.

Furthermore, polymers of formulae (1) or (2) are remarkable lubricants for various plastics such as polyolefins, polyesters and, above all, PVC (polyvinyl chloride) and enable prevention of adhesion to tools and machines for processing these plastics.

In the case of this latter application, from 0.001 to 2 parts of polymer are incorporated per 100 parts of plastic before it is processed.

In order to further illustrate the present invention and the advantages thereof, the following specific examples are given, it being understood that same are intended only as illustrative and in nowise limitative.

EXAMPLE 1

110.8 g (0.374 mole) of 4'-allyloxy-3-bewn-zylidenecamphor, prepared in accordance with Example 8 or FR-A-2,430,938, 160 g of toluene and 12 μl of a hexane solution (containing 8.45% by weight of platinum metal) of a platinum complex prepared from chloroplatinic acid and from 1,3-divinyl-1,1,3,3-tetramethyldisiloxane, as described in U.S. Pat. No. 3,814,730, were charged into a three-necked round-bottomed flask maintained at 96° C. by means of an oil bath and equipped with a central stirrer and a vertical condenser.

50 g of a random polymer containing SiH groups and having the formula:

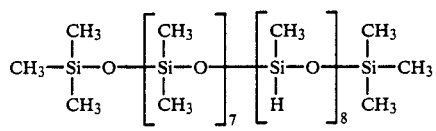
(1)

analyzed by titration at 731.3 meq/100 g of SiH functional group (meq=milliequivalent), were added over half an hour.

After 10 hours of reaction, it was determined, by determining the residual SiHs by means of butanolic potassium hydroxide, that the degree of conversion of the SiH functional groups was 99%.

A slightly yellow, clear oil, of very high viscosity was then obtained, after oluene had been removed by distillation at 100° C. at a reduced pressure of 0.66 kPa.

A proton nuclear magnetic resonance (H NMR) analysis was carried out at 360 MHz in CDCl$_3$ on a sample of the oil obtained, and the chemical shifts, in ppm, which are shown in the formula below were measured:

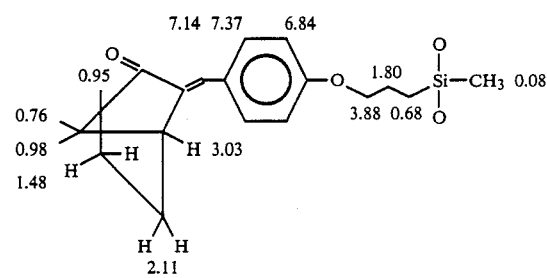

The proportion of initial camphor derivative in the oil obtained after removal of the solvent was 6.4% by weight.

The removal of this derivative was easily carried out by passing the oil through a column of silica gel (Kieselgel ART 7 754 support, marketed by Merck), the solvent used for eluting the organic derivative being a 95/5 (volume) mixture of hexane and butyl acetate, and the solvent used to elute the oil being butyl acetate.

The purified oil contained less than $3 \times 10^{-3}\%$ by weight of initial camphor derivative. It had a refractive index of approximately 1.542.

EXAMPLE 2

Preparation of
4'-allyloxy-3'-methoxy-3-benzylidenecamphor

The operating procedure of Example 8 of French Patent FR-A-2,430,938 was repeated precisely, except that 4'-hydroxy-3'-methoxy-3-benzylidenecamphor was employed as starting material. The desired product, which had a melting point of 75° C., was obtained.

Precisely the same operations as in Example 1 were then performed, except that the following were employed:

(i) 30.6 g of 4'-allyloxy-3'-methoxy-3-benzylidenecamphor;
(ii) 31 g of toluene;
(iii) 3.4 μl of platinum catalyzing solution; and
(iv) 12.5 g of polymer containing SiH groups and having the formula:

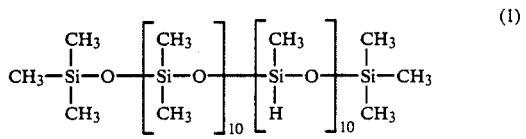
(1)

analyzed by titration at 733.9 meq/100 g of SiH functional group (meq=milliequivalent).

A degree of conversion of the SiHs of 99% was obtained after 9 hours of reaction. After removal of toluene, 40.0 g of very viscous, slightly yellow oil were isolated, analyzed by titration at 5.3% by weight of the initial camphor derivative.

H NMR analysis gave the expected concatenation:

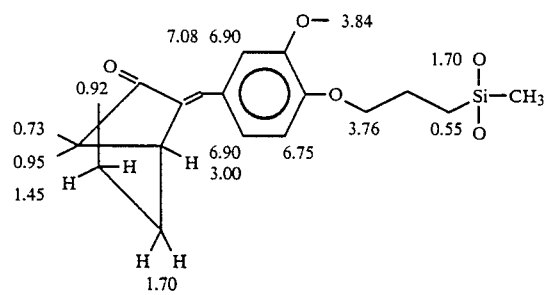

The removal of the camphor derivative was performed in the same manner as in Example 1, except that the solvent for eluting the camphor derivative was dichloromethane.

The purified oil contained less than $3 \times 10^{-3}$% by weight of camphor derivative and had a refractive index of approximately 1.540.

EXAMPLE 3

3a—Preparation of 3'-allyl-4'-methoxy-3-benzylidenecamphor

1st stage

Preparation of 3'-allyl-4'-hydroxy-3-benzylidenecamphor 296 g (1 mole) of 4'-allyloxy-3-benzylidenecamphor obtained in accordance with Example 8 of FR-A-2,430,938 were heated to 185° C. for 24 hours, under stirring The cooled reaction mixture was recrystallized from ethyl ether. 270 g of 3'-allyl-4-hydroxy-3 -benzylidenecamphor having the following characteristics were thus obtained.

(a) Melting point: 150° C.

(b) $^1$H NMR spectrum (CDCl$_3$): spectrum consistent with the expected structure

---

(c) UV spectrum (ethanol) λmax 327 nm
22600

---

(d) Elemental analysis % calculated: C: 81.04, H: 8.16. % found: C: 81.11, H: 8.18.

2nd stage

Preparation of 3'-allyl-4'-methoxy-3-benzylidenecamphor 9 g (0.03 moles) of 3'-allyl-4'-hydroxy-3-benzylidenecamphor obtained in the first stage above were dissolved in 150 cm$^3$ of 1,2-dimethoxyethane dried over molecular sieve beforehand. 2.56 g of sodium hydride were added slowly and the mixture was heated to 60° C. 8.52 g (0.06 moles) of methyl iodide were introduced dropwise, and the mixture was then refluxed for 2 hours. The solvent was evaporated off and the residue was taken up with 50 cm$^3$ of ethyl ether. The ether phase was washed twice with water and was then dried over sodium sulfate. After evaporation of the solvent, 8.8 g of 3'-allyl-4'-methoxy-3-benzylidenecamphor were recovered in the form of white crystals which had the following characteristics:

(a) Melting point: 37° C.

(b) $^1$H NMR spectrum (CDCl$_3$): spectrum consistent with the expected structure

---

(c) UV spectrum (95° ethanol) λmax 322 nm
23600

---

(d) Elemental analysis: % calculated: C: 81.25, H: 8.44, O: 10.31. % found: C: 81.35, H: 8.60, O: 10.50.

3b—Preparation of the polydimethylsiloxane of formula

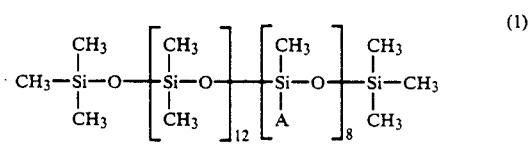 (1)

where A was the organic radical of the formula:

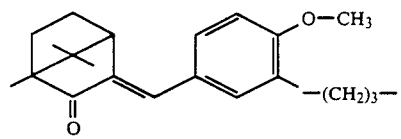

25 g (80.53 mmoles) of 3'-allyl-4'-methoxy-3-benzylidenecamphor and 25 g of toluene were charged into a three-necked round-bottomed flask maintained at 100° C. by means of an oil bath and equipped with a central stirrer and a vertical condenser.

When the temperature of the reaction mixture was 100° C., 1.60 microliters of a hexane solution (containing 9.92% by weight of platinum metal) of the platinum complex employed in Example 1 above were introduced.

10.37 g of a random polymer containing SiH groups and having the formula:

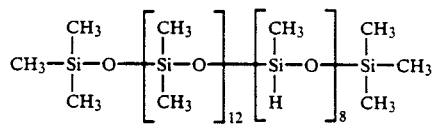

analyzed by titration at 705.8 meq/100 g of SiH functional group, were then added over 1 hour 30 minutes.

The degree of conversion of the SiHs was quantitative after 11 hours of reaction.

After removal of toluene, a viscous yellow oil analyzed by titration at 11.7% by weight of the initial camphor derivative was isolated.

$^1$H NMR analysis gave the concatenation:

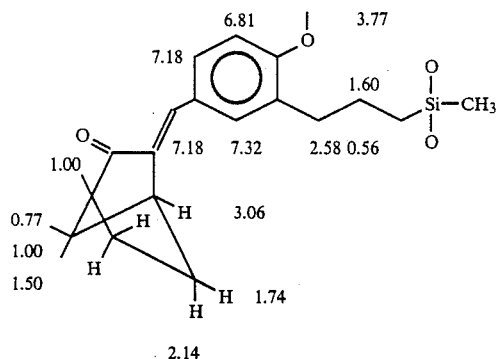

$^{29}$Si NMR analysis at 49.7 MHz in CDCl$_3$+Fe(Acac)$_3$ was consistent with the expected structure.

The removal of the initial camphor derivative was performed in the same way as in Example 1.

The purified oil contained less than $3\times10^{-3}\%$ by weight of initial camphor derivative.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A modified diorganopolysiloxane polymer having one of the structural formulae (1) or (2):

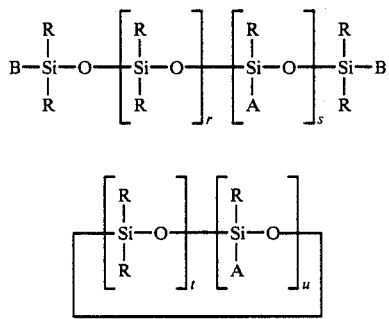

in which the symbols R, which may be identical or different, are each a C$_1$–C$_{10}$ alkyl, phenyl or 3,3,3-trifluoropropyl radicals, at least 80% of the number of radicals R being methyl radicals; the symbols B, which may be identical or different, are each a radical R or a radical A; r is an integer ranging from 0 to 200, inclusive; s is an integer ranging from 0 to 50, inclusive, with the proviso that, if s is 0, at least one of the two symbols B is A; u is an integer ranging from 1 to 20, inclusive; t is an integer ranging from 0 to 20, inclusive; t+u is equal to or greater than 3; and A is a radical of the formula (3):

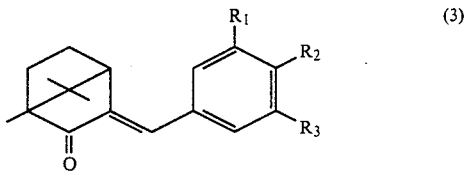

in which R$_1$ and R$_2$ are each a hydrogen atom, a C$_1$–C$_6$ alkyl radical, a C$_1$–C$_6$ alkoxy, hydroxy or trimethylsilyloxy radical, or a divalent radical Y:

$$(O)_n-(CH_2)_p-\underset{R_4}{CH}-CH_2-,$$

with the proviso that one of the two radicals R$_1$ and R$_2$ is necessarily the divalent radical Y; R$_4$ is a hydrogen atom or a C$_1$–C$_4$ alkyl radical; D is 0 or 1; p is an integer ranging from 1 to 10, inclusive; and R$_3$ is a hydrogen atom or a C$_1$–C$_6$ alkyl or C$_1$–C$_6$ alkoxy radical.

2. The modified diorganopolysiloxane polymer as defined by claim 1, having the structural formula (1).

3. The modified diorganopolysiloxane polymer as defined by claim 1, having the structural formula (2).

4. The modified diorganopolysiloxane polymer as defined by claim 1, satisfying at least one of the following parameters:
R is methyl;
B is methyl;
r ranges from 5 to 20, inclusive;
s ranges from 2 to 15, inclusive;
t+u ranges from 3 to 10, inclusive;
R$_1$ is H or methoxy;
p ranges from 1 to 3, inclusive;
R$_2$ is H or methoxy; or
R$_3$ is H or methoxy; or
one of the two radicals R$_1$ or R$_2$ is the divalent radical Y in which n=0 or 1, p=1, and R$_4$=H or methyl.

5. A process for the preparation of the modified diorganopolysiloxane polymer as defined by claim 1, comprising hydrosilylating, in the presence of a catalytically effective amount of a platinum catalyst, a polymer containing SiH groups and having the formula (4):

wherein the radicals B', which may be identical or different, are each a radical R or a hydrogen atom, or a polymer having the formula (5):

$$\left[\begin{array}{c}R\\|\\Si-O\\|\\R\end{array}\right]_t\left[\begin{array}{c}R\\|\\Si-O\\|\\H\end{array}\right]_u \quad (5)$$

with an organic derivative of 3-benzylidenecamphor having the formula (6):

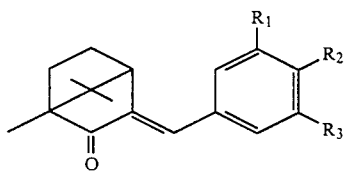
(6)
wherein the radical Y is the monovalent unsaturated homologous radical Y' of the formula $-(O)_n-(CH_2)_p-C(R_4)=CH_2$ in which n, p and $R_4$ are defined as in formula (3).
6. A lubricant composition comprising the modified diorganopolysiloxane polymer as defined by claim 1.
7. A coating composition comprising the modified diorganopolysiloxane polymer as defined by claim 1.
* * * * *